US012013093B2

(12) United States Patent
Muramatsu et al.

(10) Patent No.: US 12,013,093 B2
(45) Date of Patent: Jun. 18, 2024

(54) LAMP UNIT

(71) Applicant: KOITO MANUFACTURING CO., LTD., Tokyo (JP)

(72) Inventors: Teppei Muramatsu, Shizuoka (JP); Yuta Ugajin, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/256,255

(22) PCT Filed: Dec. 2, 2021

(86) PCT No.: PCT/JP2021/044226
§ 371 (c)(1),
(2) Date: Jun. 7, 2023

(87) PCT Pub. No.: WO2022/130997
PCT Pub. Date: Jun. 23, 2022

(65) Prior Publication Data
US 2024/0019094 A1 Jan. 18, 2024

(30) Foreign Application Priority Data
Dec. 15, 2020 (JP) ................................ 2020-207632

(51) Int. Cl.
*F21S 41/32* (2018.01)
*F21S 41/143* (2018.01)
(Continued)

(52) U.S. Cl.
CPC ............ *F21S 41/24* (2018.01); *F21S 41/143* (2018.01); *F21S 41/27* (2018.01); *F21S 41/28* (2018.01); *F21S 41/32* (2018.01)

(58) Field of Classification Search
CPC .......... F21S 41/24; F21S 41/27; F21S 41/143; F21S 41/28; F21S 41/32; F21S 41/20;
(Continued)

(56) References Cited

U.S. PATENT DOCUMENTS 9,714,747 B2 7/2017 Tsukamoto
11,274,802 B2 3/2022 Dressler
(Continued)

FOREIGN PATENT DOCUMENTS

CN 104832859 A 8/2015
CN 212132312 U * 12/2020
(Continued)

OTHER PUBLICATIONS

Search English translation of WO-2016162921-A1 (Year: 2016).*
(Continued)

*Primary Examiner* — Omar Rojas Cadima
(74) *Attorney, Agent, or Firm* — Pearne & Gordon LLP

(57) ABSTRACT

A light unit is configured in such a manner that a light guide is placed between a light source and a projection lens, and includes a first exit surface for emitting light for a low-beam light distribution pattern and a second exit surface for emitting light for an additional light distribution pattern that is added to form a high-beam light distribution pattern. The light guide is configured to be provided with a mirror surface portion on a connection surface extending toward the back of the unit from a lower edge of the first exit surface to an upper edge of the second exit surface. As a result, light from a light-emitting element that has been emitted through the second exit surface and reached the connection surface is reflected by the mirror surface portion to be used as the light for forming the additional light distribution pattern.

5 Claims, 15 Drawing Sheets

(51) Int. Cl.
*F21S 41/20* (2018.01)
*F21S 41/24* (2018.01)
*F21S 41/27* (2018.01)

(58) Field of Classification Search
CPC ........ F21S 43/20; F21S 43/235; F21S 43/243; F21S 41/37; F21S 41/275; F21S 41/322; F21S 41/323; F21W 2102/13; F21W 2102/135; F21W 2102/155; F21W 2102/14; F21W 2107/10; F21W 2107/00; F21V 7/0091
See application file for complete search history.

(56) References Cited

U.S. PATENT DOCUMENTS

| | | | | |
|---|---|---|---|---|
| 2010/0226142 | A1 | 9/2010 | Brendle et al. | |
| 2016/0040848 | A1 | 2/2016 | Tsukamoto | |
| 2017/0198877 | A1 | 7/2017 | Suwa et al. | |
| 2017/0292671 | A1 * | 10/2017 | Gousset-Rousseau | ...................... F21S 41/153 |
| 2021/0080072 | A1 | 3/2021 | Dressler | |

FOREIGN PATENT DOCUMENTS

| | | | | |
|---|---|---|---|---|
| DE | 102015215200 | A1 | 2/2016 | |
| DE | 102016008422 | A1 | 1/2018 | |
| DE | 202017106281 | U1 | 2/2019 | |
| DE | 102018110793 | A1 | 11/2019 | |
| EP | 2306075 | A2 | 4/2011 | |
| EP | 2711611 | A1 | 3/2014 | |
| JP | 2015185533 | A | 10/2015 | |
| JP | 2017-199660 | A | 11/2017 | |
| JP | 2019-160805 | A | 9/2019 | |
| KR | 1020190080434 | A | 7/2019 | |
| WO | WO-2016162921 | A1 * | 10/2016 | ............ F21S 41/143 |

OTHER PUBLICATIONS

Search English translation of CN-212132312-U (Year: 2020).*
International Search Report dated Jan. 25, 2022 filed in PCT/JP2021/044226.
Office Action issued on Mar. 19, 2024 for the corresponding Japanese Patent Application No. 2020-207632.
EESR issued on Apr. 17, 2024 for the corresponding European Patent Application No. 21906360.9.

* cited by examiner

LAMP UNIT

TECHNICAL FIELD

The invention of the present application relates to a light unit including a projection lens.

BACKGROUND ART

A light unit is known related art which is configured in such a manner as to project light from a light source to the front of the unit through a projection lens.

"Patent Literature 1" describes, as a configuration of such a light unit, a configuration in which a light guide that is configured in such a manner as to guide light emitted from a light source into a projection lens is placed between the light source and the projection lens.

The light unit described in "Patent Literature 1" is configured to include, as light sources thereof, a first light source for forming a low-beam light distribution pattern, and a second light source for forming a high-beam light distribution pattern by being turned on simultaneously with the first light source, and is configured to include, as light guides thereof, a first light guide for guiding light emitted from the first light source, and a second light guide for guiding light emitted from the second light source.

The light unit described in "Patent Literature 1" is configured in such a manner that a cut-off line of the low-beam light distribution pattern is formed with the shape of the lower edge of the exit surface of the first light guide, and is configured in such a manner that, upon the formation, a part of the light from the first light source that has entered the first light guide is totally reflected by the underside of the first light guide.

CITATION LIST

Patent Literature

Patent Literature 1: JP-A-2017-199660

SUMMARY OF INVENTION

Problems to be Solved by Invention

If such a light unit includes a light guide formed of a single member, the number of components of the light unit can be reduced. As a result, a reduction in the cost of the light unit can be promoted.

Upon the configuration, if a light guide is configured to include a first exit surface for emitting light for a low-beam light distribution pattern and a second exit surface for emitting light for an additional light distribution pattern that is added to the low-beam light distribution pattern to form a high-beam light distribution pattern, and further configured in such a manner as to form the second exit surface at a position displaced toward the back of the unit relative to the first exit surface, it is possible to form a cut-off line of the low-beam light distribution pattern by use of the lower edge of the first exit surface.

On the other hand, if such a configuration is adopted, the light guide is formed with a connection surface extending toward the back of the unit from the lower edge of the first exit surface to the upper edge of the second exit surface, but the light from the second light source that has been emitted through the second exit surface and reached the connection surface results in re-entering the light guide through the connection surface. Therefore, the luminous flux utilization factor for the light emitted from the second light source decreases. Consequently, the brightness of the additional light distribution pattern decreases. Therefore, the high-beam light distribution pattern results in being unable to be formed with desired luminous intensity distribution.

The invention of the present application has been made in view of such circumstances, and an object thereof is to provide a light unit including a projection lens, which can form a low-beam light distribution pattern and a high-beam light distribution pattern appropriately in addition to promoting cost reduction based on a reduction in the number of components of the light unit.

Solution to Problems

The invention of the present application aims to achieve the above object by devising a configuration of a light guide placed between a light source and a projection lens.

In other words, a light unit according to the invention of the present application is a light unit configured to project light from a light source to the front of the unit through a projection lens, in which a light guide configured to guide the light emitted from the light source into the projection lens is placed between the light source and the projection lens, the light source includes a first light source for forming a low-beam light distribution pattern, and a second light source for forming a high-beam light distribution pattern by being turned on simultaneously with the first light source, the light guide includes a first exit surface for emitting light for the low-beam light distribution pattern, and a second exit surface for emitting light for an additional light distribution pattern that is added to the low-beam light distribution pattern to form the high-beam light distribution pattern, the second exit surface is formed below the first exit surface and at a position displaced toward the back of the unit relative to the first exit surface, the light guide includes a connection surface extending toward the back of the unit from a lower edge of the first exit surface to an upper edge of the second exit surface, and the connection surface is provided with a mirror surface portion.

As long as the "connection surface" is formed in such a manner as to extend toward the back of the unit from the lower edge of the first exit surface to the upper edge of the second exit surface, the specific placement, surface shape, and the like of the connection surface are not particularly limited.

The "mirror surface portion" may be provided all over the connection surface, or may be provided only on a part of the connection surface.

The specific configuration of the "mirror surface portion" is not particularly limited. For example, a mirror surface portion formed by aluminum vacuum vapor deposition, or a mirror surface portion formed by attaching an aluminum foil thereto can be adopted.

Effects of Invention

A light unit according to the invention of the present application is configured in such a manner as to project light from a light source to the front of the unit through a projection lens. However, a light guide that is configured in such a manner as to guide the light emitted from the light source into the projection lens is placed between the light source and the projection lens. As a result, it is possible to form a light distribution pattern of a desired shape by the light guide controlling the light that enters the projection lens.

Specifically, the light source includes a first light source for forming a low-beam light distribution pattern, and a second light source for forming a high-beam light distribution pattern by being turned on simultaneously with the first light source, and the light guide includes a first exit surface for emitting light for the low-beam light distribution pattern, and a second exit surface for emitting light for an additional light distribution pattern that is added to the low-beam light distribution pattern to form the high-beam light distribution pattern. As a result, it is possible to selectively form the low-beam light distribution pattern and the high-beam light distribution pattern.

Upon the formation, below the first exit surface, the second exit surface of the light guide is displaced toward the back of the unit relative to the first exit surface. Consequently, a cut-off line of the low-beam light distribution pattern can be formed based on the shape of a lower edge of the first exit surface.

In addition, the light guide includes a connection surface extending toward the back of the unit from the lower edge of the first exit surface to an upper edge of the second exit surface, and the connection surface is provided with a mirror surface portion. Consequently, the following operations and effects can be obtained.

In other words, if the light from the second light source that has been emitted through the second exit surface and reached the connection surface results in re-entering the light guide through the connection surface, the luminous flux utilization factor of the light emitted from the second light source decreases. Consequently, the brightness of the additional light distribution pattern decreases. Therefore, the high-beam light distribution pattern results in being unable to be formed with desired luminous intensity distribution.

However, in the invention of the present application, the connection surface of the light guide is provided with the mirror surface portion; therefore, it is possible to avoid or restrain the light from the second light source that has been emitted through the second exit surface and reached the connection surface from re-entering the light guide through the connection surface. Consequently, it is possible to form the high-beam light distribution pattern with desired luminous intensity distribution.

In addition, the light guide is formed of a single member; therefore, it is possible to obtain the above operations and effects in addition to promoting cost reduction based on a reduction in the number of components of the light unit.

As described above, according to the invention of the present application, the light unit including the projection lens can form the low-beam light distribution pattern and the high-beam light distribution pattern appropriately in addition to promoting cost reduction based on a reduction in the number of components of the light unit.

If, in the above configuration, the connection surface of the light guide is further configured to include a region located near a back focal point of the projection lens as a light transmission portion, the following operations and effects can be obtained.

In other words, the focal point neighboring portion of the light guide, which is located near the back focal point of the projection lens, may become hot due to concentration of, for example, sunlight that enters from the outside of the light unit through the projection lens. In such a case, the light guide is likely to be eroded depending on the material of the light guide. In such a case, if the mirror surface portion is provided all over the connection surface of the light guide, heat is more likely to be trapped in the focal point neighboring portion of the light guide. Therefore, erosion becomes more likely to occur.

Contrarily, if the light guide is configured in such a manner that the connection surface includes the region located near the back focal point of the projection lens, as the light transmission portion, a part of, for example, sunlight that enters the focal point neighboring portion of the light guide can be emitted to a lower space without being reflected by the connection surface. Consequently, heat can be made less likely to be trapped in the focal point neighboring portion. Therefore, occurrence of erosion can be effectively restrained.

If, in the above configuration, the connection surface of the light guide is further configured to include a neighboring region of a front edge of the connection surface, as a light transmission portion, the following operations and effects can be obtained.

In other words, the light from the second exit surface that has been emitted through the second exit surface and reached the neighboring region of the front edge of the connection surface results in re-entering the light guide through the light transmission portion of the neighboring region of the front edge, and being emitted to the front of the unit through a neighboring region of the lower edge of the first exit surface. The emitted light is then projected to the front of the unit through the projection lens, which enables forming the additional light distribution pattern whose lower edge portion partially overlaps a neighboring region of the cut-off line of the low-beam light distribution pattern. Therefore, the high-beam light distribution pattern can be formed as a substantially uniform light distribution pattern in which the low-beam light distribution pattern and the additional light distribution pattern are smoothly connected.

If, in the above configuration, the front-to-back width of the neighboring region of the front edge is further configured in such a manner as to be set at a value equal to or less than ⅓ of the front-to-back width of the connection surface, the high-beam light distribution pattern can be formed with more preferable luminous intensity distribution.

If, in the above configuration, the light guide further includes a resin member, the focal point neighboring portion of the light guide is likely to be eroded due to, for example sunlight that enters from the outside of the light unit through the projection lens. Therefore, it is particularly effective to form the region on the connection surface, the region being located near the back focal point of the projection lens, as the light transmission portion.

If, in the above configuration, in addition to including a plurality of the first light sources, the light guide is further configured to include a plurality of entrance portions for letting in light emitted from the plurality of the respective first light sources, it is possible to easily and clearly form the low-beam light distribution pattern in a desired shape.

BEST MODE OF CARRYING OUT INVENTION

An embodiment of the invention of the present application is described hereinafter with reference to the drawings.

Figure 1:
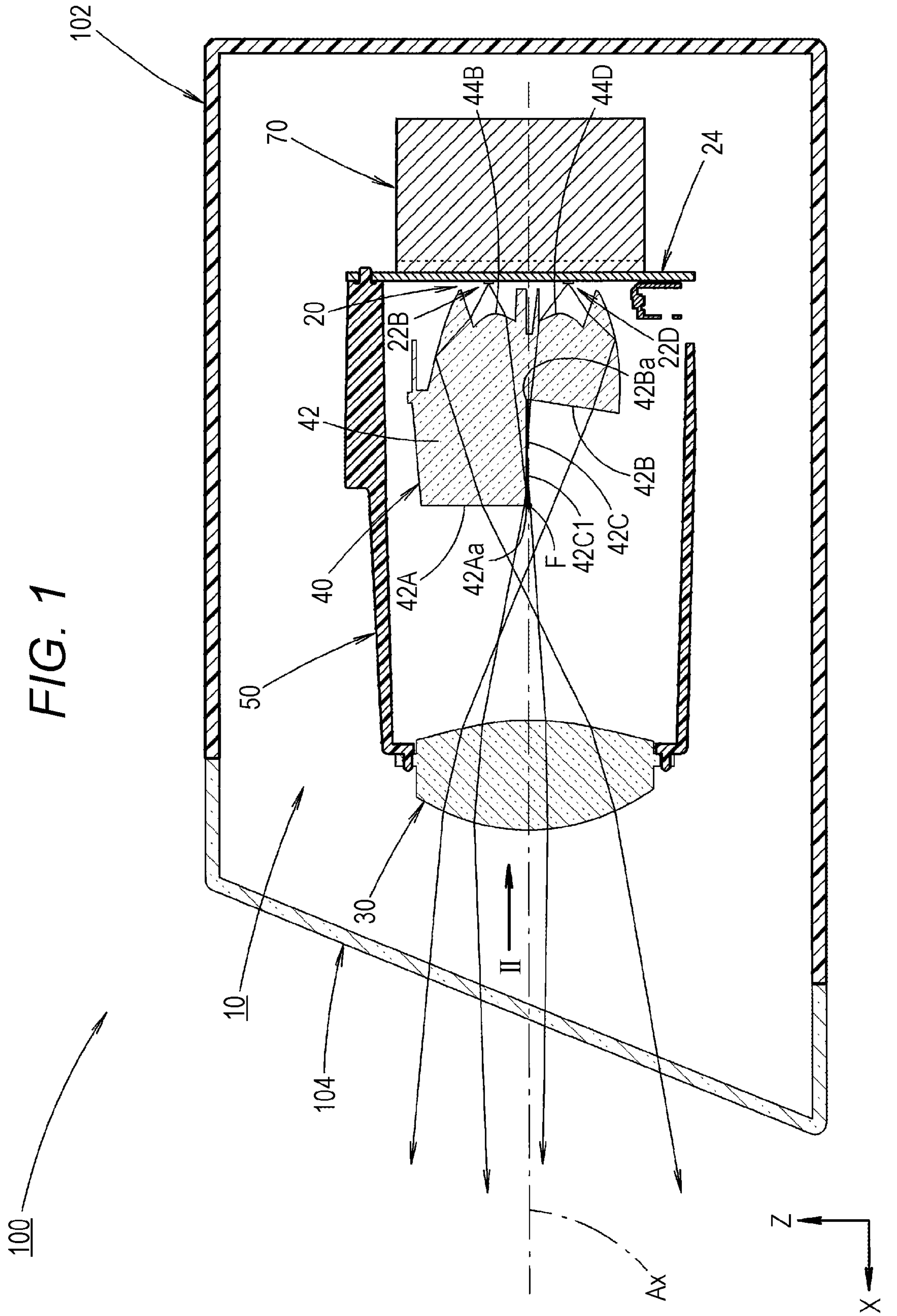
FIG. 1 is a side cross-sectional view illustrating a vehicle light including a light unit according to one embodiment of the invention of the present application.

FIG. 1 is a side cross-sectional view illustrating a vehicle light 100 including a light unit 10 according to one embodiment of the invention of the present application. Moreover, FIG. 2 is an arrow view in direction II of FIG. 1.

Figure 2:
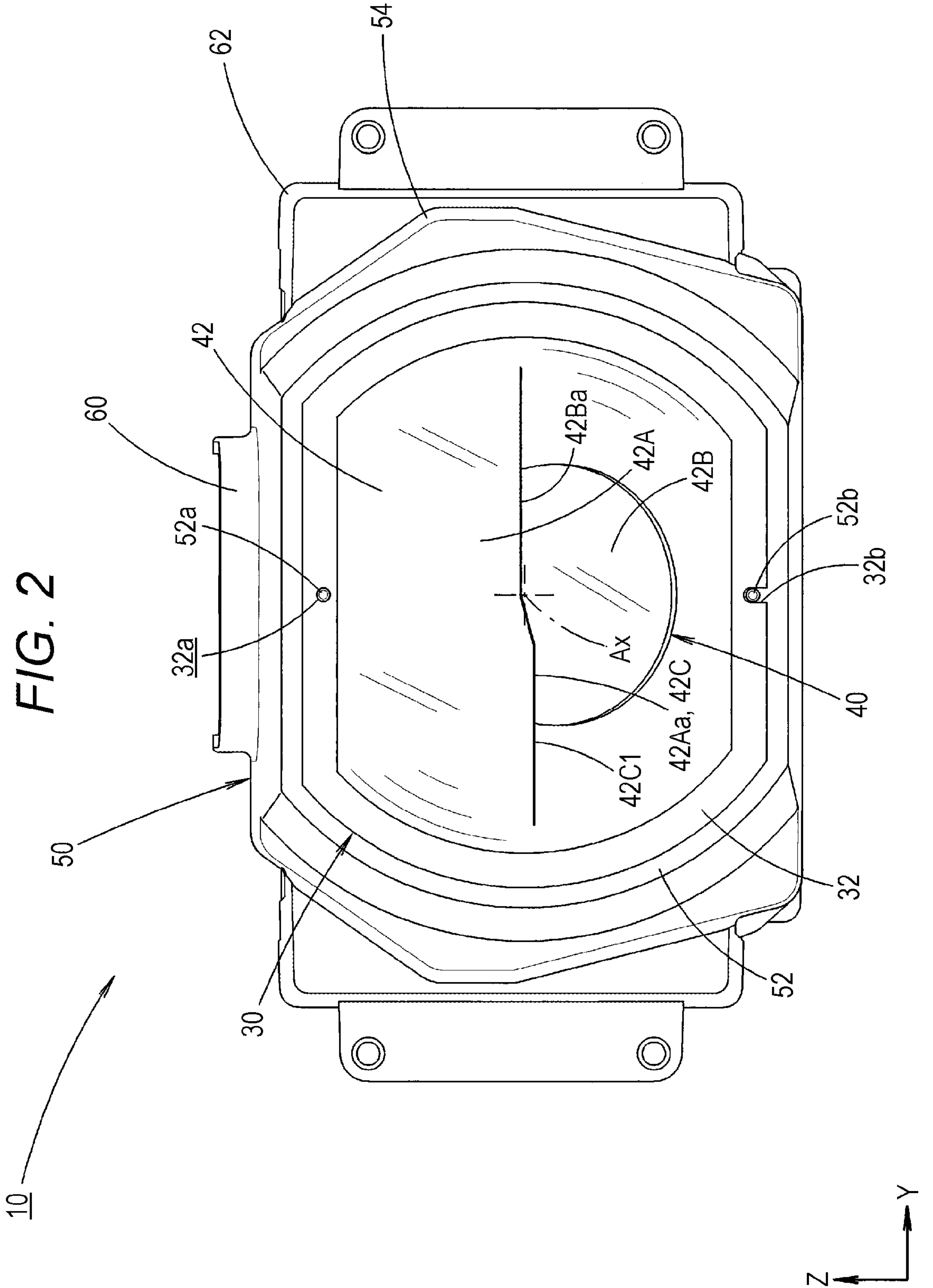
FIG. 2 is an arrow view in direction II of FIG. 1.

In FIGS. 1 and 2, a direction represented by X is "front of the unit," a direction represented by Y is "left" ("right" in a front view of the unit) orthogonal to "front of the unit," and a direction represented by Z is "upward". The same applies to the drawings other than FIGS. 1 and 2.

The vehicle light 100 is a headlamp provided at the front end of a vehicle, and is configured in such a manner that the light unit 10 is housed in a light chamber formed by a lamp body 102 and a translucent cover 104 with an optical axis of the light unit 10 adjusted to substantially align a front-and back direction of the light unit 10 (that is, a front-and back direction of the unit) with a front-and back direction of the vehicle.

The light unit 10 is a projector light unit, and is configured in such a manner that a low-beam light distribution pattern and a high-beam light distribution pattern (which are described below) can be formed by projecting light from a light source 20 to the front of the unit through a projection lens 30.

The projection lens 30 has an optical axis Ax extending in a front-and-back direction of the unit, and is configured in such a manner as to form the light distribution patterns by inversely projecting projection images formed in the back focal plane of the projection lens 30.

A light guide 40 that is configured in such a manner as to guide the light emitted from the light source 20 into the projection lens 30 is placed between the projection lens 30 and the light source 20 placed in the back of the unit. The projection image is then formed in the light guide 40.

Figure 3:
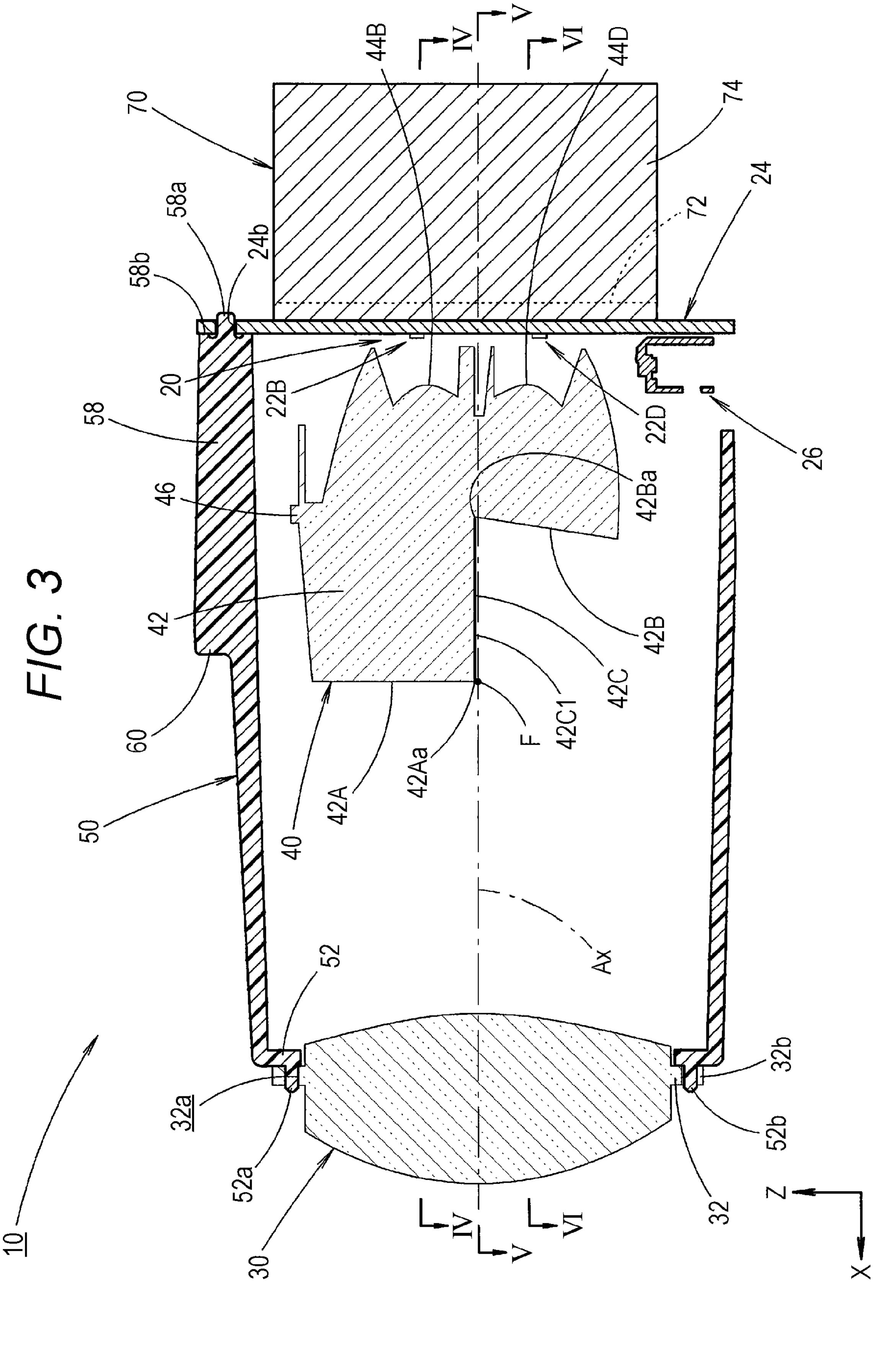
FIG. 3 is a side cross-sectional view illustrating the light unit alone.
Figure 4:
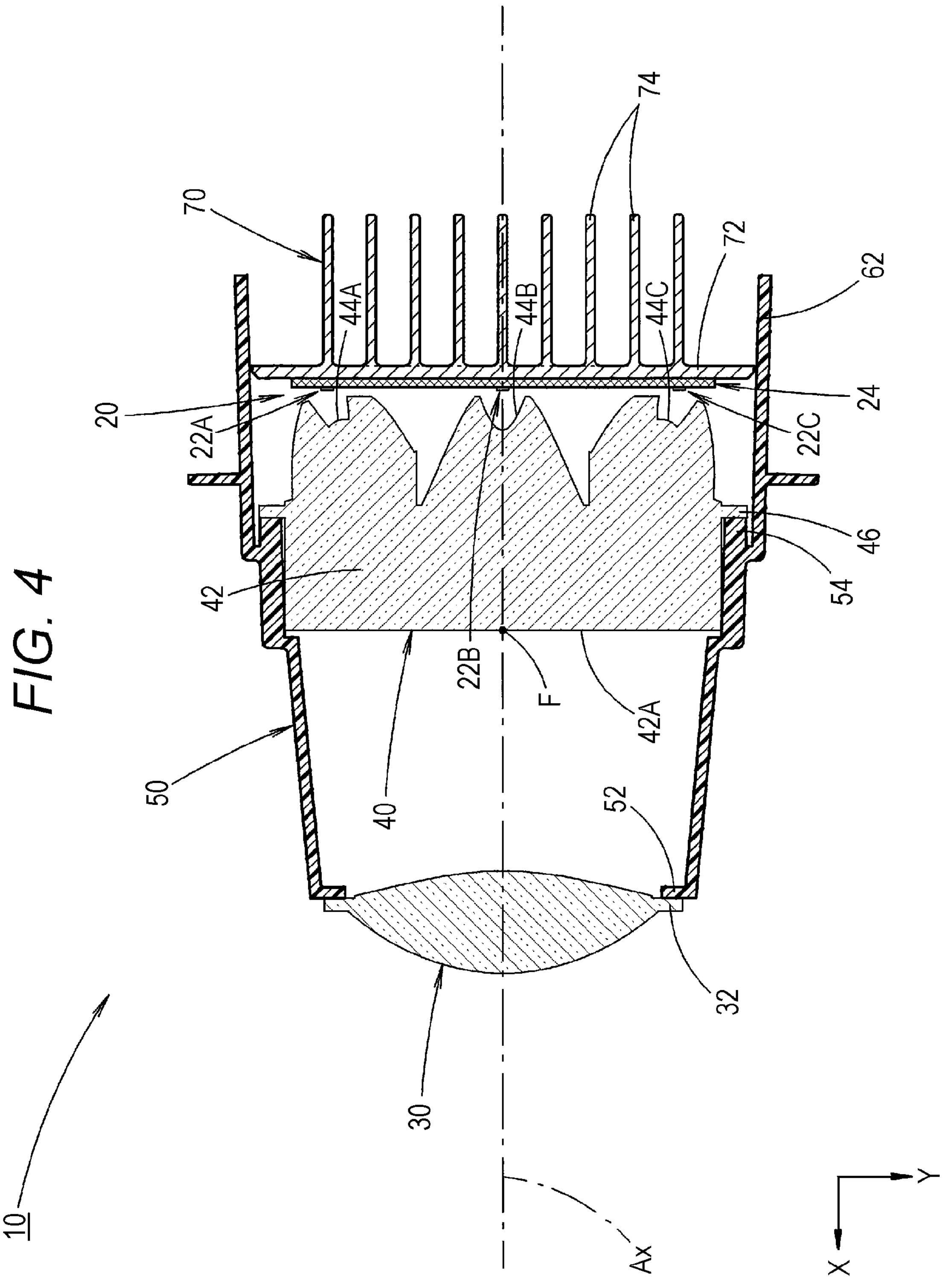
FIG. 4 is a cross-sectional view taken along line IV-IV of FIG. 3.
Figure 5:
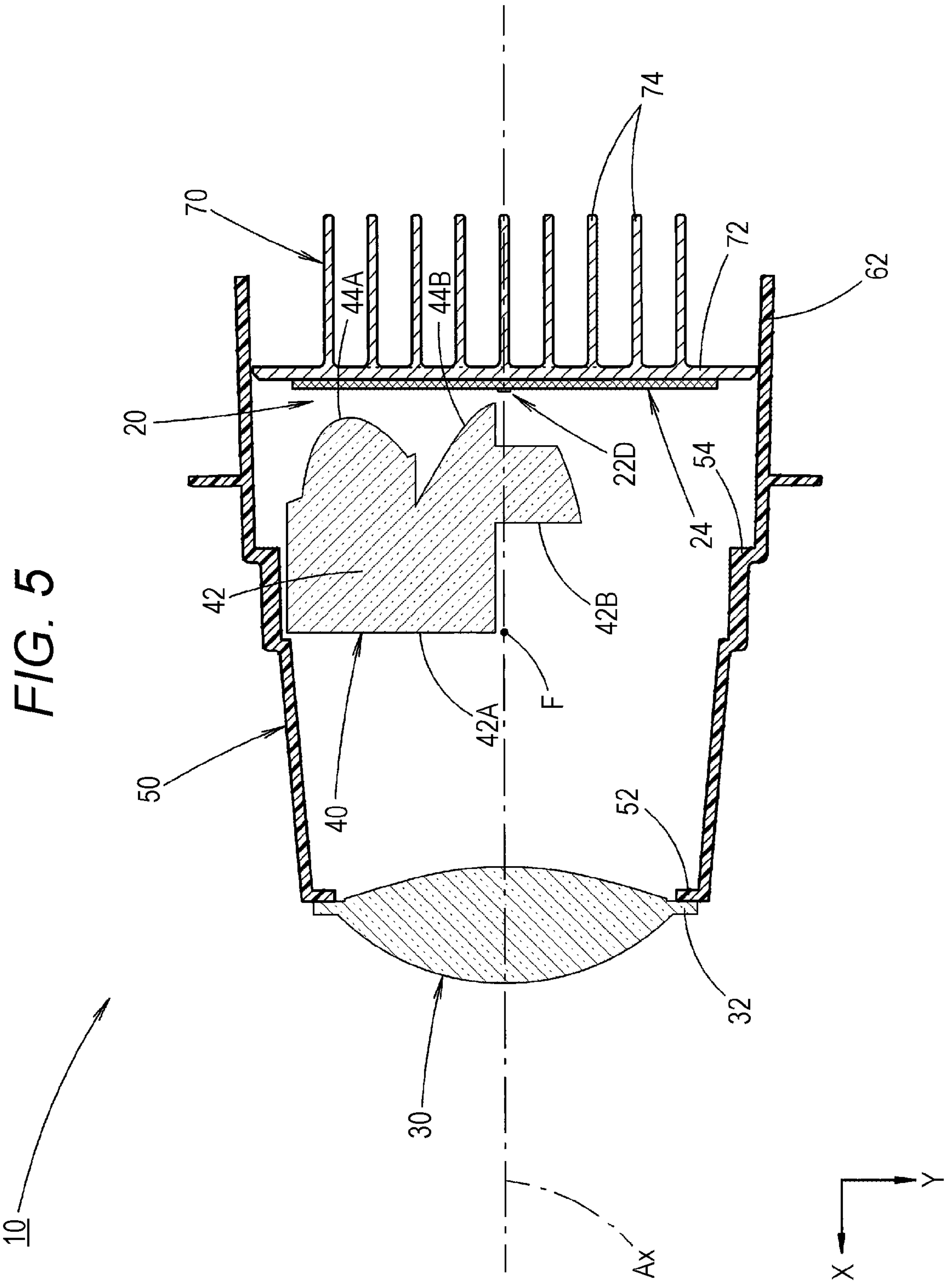
FIG. 5 is a cross-sectional view taken along line V-V of FIG. 3.
Figure 6:
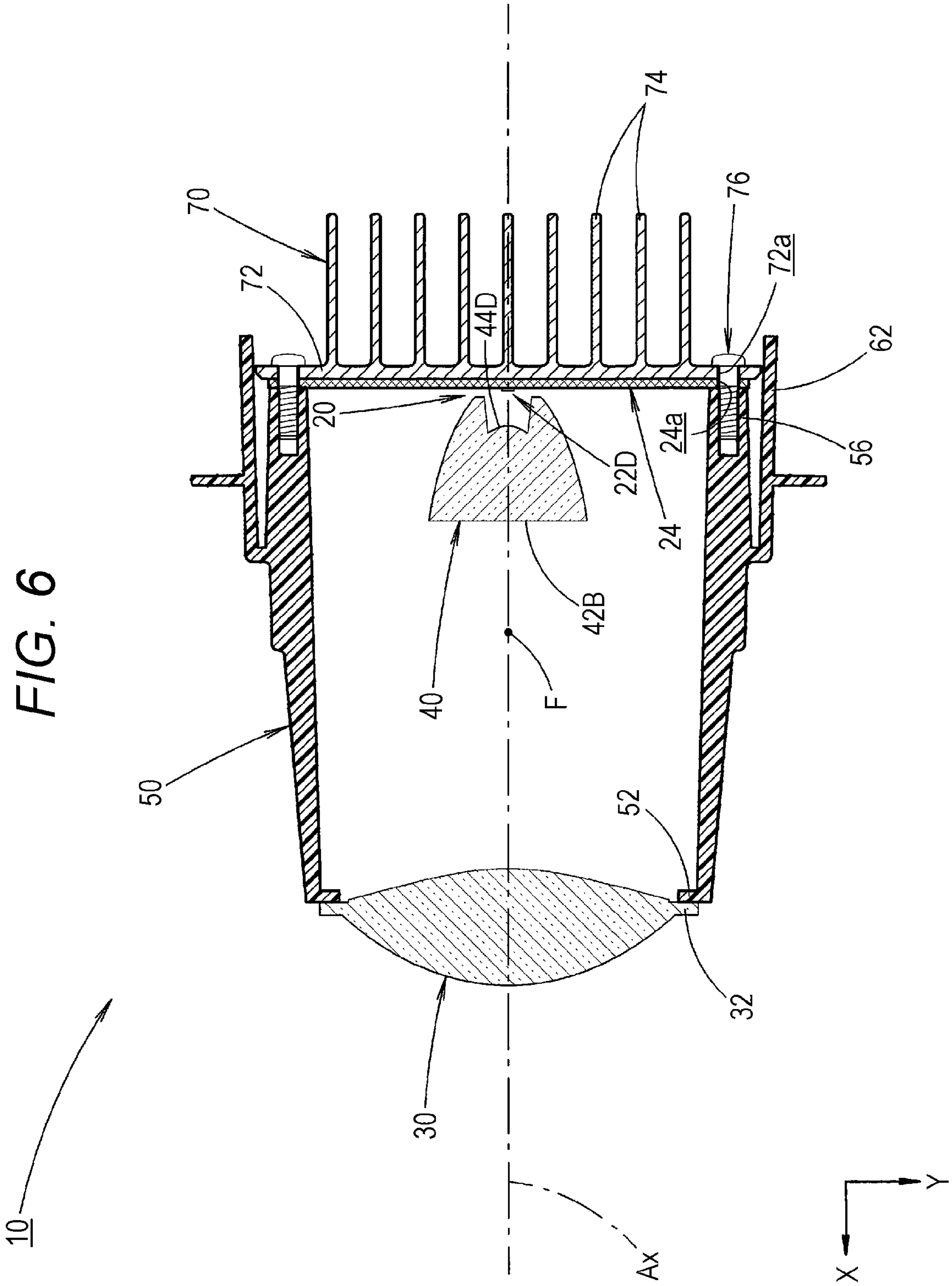
FIG. 6 is a cross-sectional view taken along line VI-VI of FIG. 3.
Figure 7:
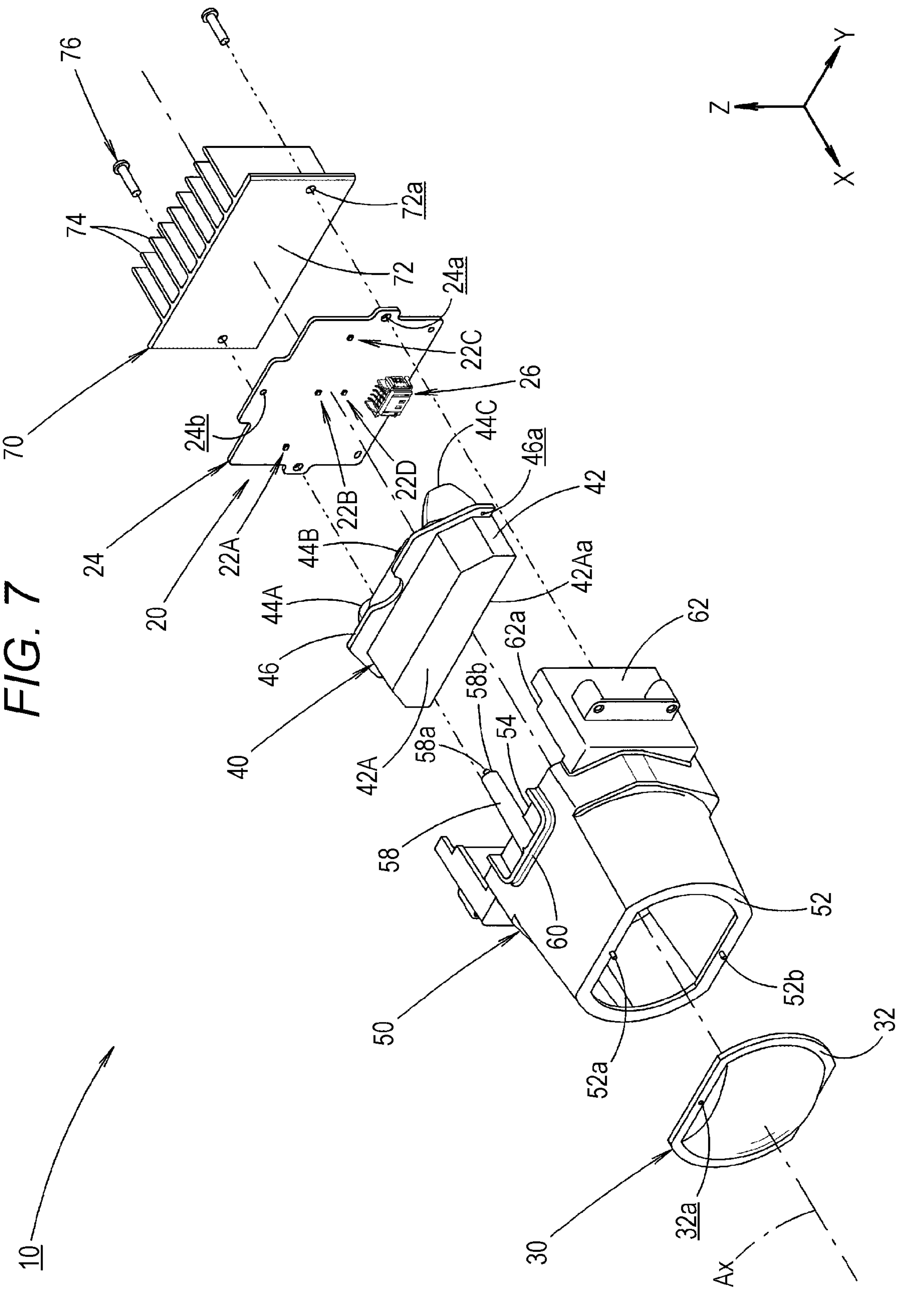
FIG. 7 is an exploded perspective view illustrating the light unit as viewed obliquely from the front.
Figure 8:
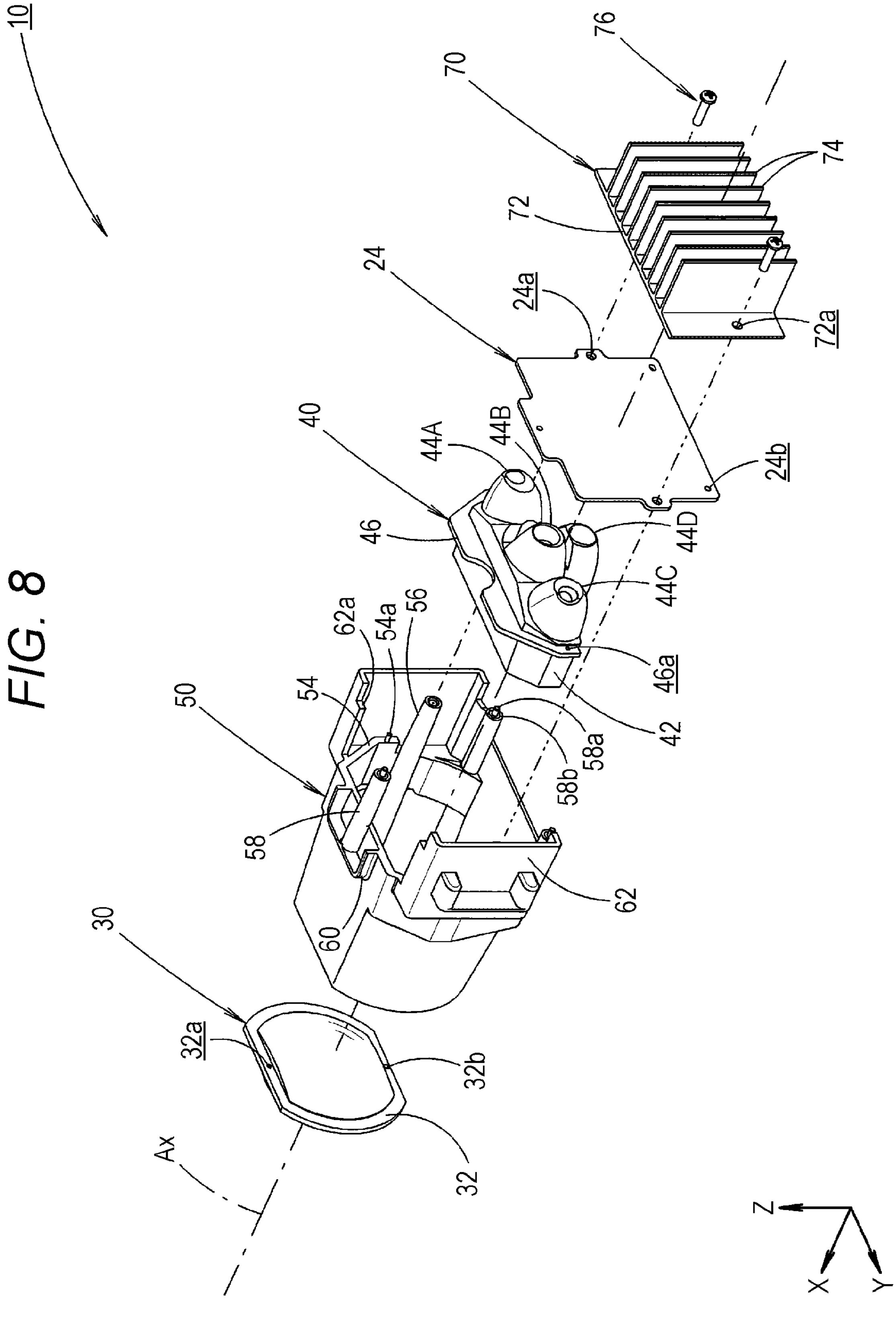
FIG. 8 is an exploded perspective view illustrating the light unit as viewed obliquely from the back.

FIG. 3 is a side cross-sectional view illustrating the light unit 10 alone. Moreover, FIG. 4 is a cross-sectional view taken along line IV-IV of FIG. 3, FIG. 5 is a cross-sectional view taken along line V-V of FIG. 3, and FIG. 6 is a cross-sectional view taken along line VI-VI of FIG. 3. Furthermore, FIG. 7 is an exploded perspective view illustrating the light unit 10 as viewed obliquely from the front, and FIG. 8 is an exploded perspective view illustrating the light unit 10 as viewed obliquely from the back.

As illustrated in these drawings, the projection lens 30 is a biconvex aspherical lens having an outer peripheral flange portion 32, and is formed of a colorless and transparent acrylic resin member. The projection lens 30 is supported at the outer peripheral flange portion 32 by a lens holder 50.

The lens holder 50 is a tubular member extending in the front-and-back direction of the unit, is formed of an opaque polycarbonate resin member, and includes an annular lens support portion 52 formed at the front end of the lens holder 50.

The projection lens 30 is fixed to the lens holder 50 by laser welding with the outer peripheral flange portion 32 pressed against the lens support portion 52 of the lens holder 50 from the front of the unit.

It is configured in such a manner that, upon the fixation, the projection lens 30 is positioned relative to the lens holder 50 in a direction orthogonal to the front-and-back direction of the unit by engaging a pair of upper and lower positioning pins 52*a* and 52*b* formed on the lens support portion 52 of the lens holder 50 with a positioning hole 32*a* and a positioning groove 32*b* that are formed in the upper and lower parts of the outer peripheral flange portion 32 of the projection lens 30.

The light source 20 includes four light-emitting elements 22A, 22B, 22C, and 22D mounted on a common board 24. Each of the four light-emitting elements 22A to 22D is a white light-emitting diode having a horizontal rectangular light-emitting surface, and is placed with its light-emitting surface facing the front of the unit.

Out of the four light-emitting elements 22A to 22D, three light-emitting elements 22A to 22C are configured in such a manner as to be turned on to form the low-beam light distribution pattern, and the remaining one light-emitting element 22D is additionally turned on to form the high-beam light distribution pattern.

The three light-emitting elements 22A to 22C are placed at a position directly above the optical axis Ax of the projection lens 30 and positions separated from each other at a fixed interval on the left and right sides of the one directly above the optical axis Ax. The light-emitting element 22D is placed at a position directly below the optical axis Ax.

The board 24 is supported by the lens holder 50, placed in such a manner as to extend along a vertical plane orthogonal to the optical axis Ax of the projection lens 30 (which is described below).

A connector 26 electrically connected to the four light-emitting elements 22A to 22D via a conductive pattern (not illustrated) is mounted at the bottom middle end of the front surface of the board 24. It is configured in such a manner that power is supplied to the four light-emitting elements 22A to 22D by attaching a power supply connector (not illustrated) to the connector 26.

The light guide 40 is formed of a colorless and transparent polycarbonate resin member.

The light guide 40 includes a first exit surface 42A for emitting light for the low-beam light distribution pattern and a second exit surface 42B for emitting light for an additional light distribution pattern that is added to the low-beam light distribution pattern to form the high-beam light distribution pattern.

The first exit surface 42A is located in the upper part of the front surface of the light guide 40, and is formed in such a manner as to extend along the back focal plane of the projection lens 30. As illustrated in FIG. 7, the first exit surface 42A has a substantially horizontal rectangular outer shape having chamfered top left and right corners. As illustrated in FIGS. 2 and 3, a lower edge 42Aa of the first exit surface 42A is formed in such a manner as to pass near above a back focal point F of the projection lens 30 and extend in the horizontal direction at different heights on the left and right sides.

The second exit surface 42B is located in the lower part of the front surface of the light guide 40, and is formed at a position a fixed distance away from the back focal plane of the projection lens 30 toward the back of the unit in such a manner as to extend along a plane slightly inclined backward relative to the vertical plane orthogonal to the optical axis Ax of the projection lens 30. The second exit surface 42B is located directly below the optical axis Ax and has a substantially horizontal elliptical outer shape with its upper part cut away.

The light guide 40 includes a block portion 42 extending toward the back of the unit while substantially maintaining the outer shape of the first exit surface 42. The underside of the block portion 42 is formed as a connection surface 42C extending in the horizontal direction toward the back of the unit from the lower edge 42Aa of the first exit surface 42A to an upper edge 42Ba of the second exit surface 42B. The connection surface 42C is provided with a mirror surface portion 42C1 (which is described below).

Moreover, the light guide 40 includes four entrance portions 44A, 44B, 44C, and 44D for letting in the light emitted from the four light-emitting elements 22A, 22B, 22C, and 22D, respectively. Upon the configuration, three entrance portions 44A to 44C are formed in such a manner as to be located on the front side of the unit relative to the three light-emitting elements 22A to 22C, respectively, and on the back side of the unit relative to the block portion 42. On the other hand, the remaining one entrance portion 44D is formed in such a manner as to be located on the front side of the unit relative to the light-emitting element 22D and on the back side of the unit relative to the second exit surface 42B.

The three entrance portions 44A to 44C are configured in such a manner as to let in the light emitted from the three light-emitting elements 22A to 22C, respectively, and then guide the light into the block portion 42 directly or after totally reflecting the light by the entrance portions 44A to 44C. The block portion 42 is configured in such a manner as to guide the incident light from the three entrance portions 44A to 44C to the first exit surface 42A. It is configured in such a manner that upon guiding the light, the light that has reached the connection surface 42C is totally reflected by the connection surface 42C and then guided to the first exit surface 42A. The entrance portion 44D is configured in such a manner as to let in the light emitted from the light-emitting element 22D and then guide the light to the second exit surface 42B directly or after totally reflecting the light thereby.

As illustrated in FIG. 1, the light from the light-emitting element 22B that has entered the light guide 40 from the entrance portion 44B located directly above the optical axis Ax is emitted toward the projection lens 30 through the first exit surface 42A, and is projected to the front of the unit from the projection lens 30 as substantially downward light. The same applies to light from the light-emitting elements 22A and 22C that has entered the light guide 40 from the entrance portions 44A and 44C located on the left and right sides. On the other hand, the light from the light-emitting element 22D that has entered the light guide 40 from the entrance portion 44D is emitted toward the projection lens 30 through the second exit surface 42B, and is projected to the front of the unit from the projection lens 30 as substantially upward light.

As illustrated in FIGS. 7 and 8, an outer peripheral flange portion 46 extending along the vertical plane orthogonal to the optical axis Ax is formed on the top, left, and right sides at the back end of the block portion 42 in the light guide 40. The light guide 40 is supported by the lens holder 50 at the outer peripheral flange portion 46, housed in the internal space of the lens holder 50.

The lens holder 50 is provided with a light guide support portion 54 extending along the outer peripheral flange portion 46 of the light guide 40.

The light guide 40 is fixed to the lens holder 50 by laser welding with the outer peripheral flange portion 46 pressed against the back surface of the light guide support portion 54 of the lens holder 50 from the back of the unit.

It is configured in such a manner that upon fixing the light guide 40, a pair of left and right positioning pins 54*a* formed on the light guide support portion 54 of the lens holder 50 is engaged in a pair of left and right positioning holes 46*a* formed in the outer peripheral flange portion 46 of the light guide 40 to determine the position of the light guide 40 relative to the lens holder 50 in the direction orthogonal to the front-and-back direction of the unit.

The light unit 10 includes a heat sink 70 made of metal (for example, aluminum) for dissipating heat generated by the four light-emitting elements 22A, 22B, 22C, and 22D.

The heat sink 70 includes a main portion 72 extending along the vertical plane orthogonal to the optical axis Ax of the projection lens 30, and a plurality of radiating fins 74 extending from the main portion 72 toward the back of the unit along the vertical plane. The heat sink 70, together with the board 24, is supported by the lens holder 50 with the front surface of the main portion 72 in surface contact with the back surface of the board 24.

The board 24 and the heat sink 70 are supported on the lens holder 50 by mechanical fastening. Specifically, the board 24 and the heat sink 70 are screwed to the lens holder 50 in two places on the left and right sides to be fixed to the lens holder 50.

A pair of left and right screw bosses 56 is formed in the lens holder 50, and pairs of left and right screw insertion holes 24*a* and 72*a* for inserting screws 76 for fastening together are formed in the board 24 and the main portion 72 of the heat sink 70.

The lens holder 50 is provided with stepped positioning pins 58 extending toward the back of the unit, in three places at the top middle end and at the bottom left and right ends. Moreover, the board 24 is provided with positioning holes 24*b* in three places at the top middle end and at the bottom left and right ends. It is configured in such a manner that distal end small-diameter portions 58*a* of the stepped positioning pins 58 are inserted into the positioning holes 24*b* of the board 24, respectively, and the board 24 comes into contact with distal end flat portions 58*b* of the stepped positioning pins 58 to determine the position of the board 24 relative to the lens holder 50 in the front-and-back direction of the unit and in the direction orthogonal to the front-and-back direction of the unit.

The upper wall portion of the lens holder 50 is provided with a reinforcing rib having a substantially U shape that is formed in such a manner as to be connected to the base portion of the stepped positioning pin 58.

Moreover, the lens holder 50 is provided with a pair of left and right positioning portions 62 for determining the position of the heat sink 70 in the direction orthogonal to the front-and-back direction of the unit. These positioning portions 62 are formed in such a manner as to extend toward the back of the unit by extending over the upper and lower end surfaces of the main portion 72 at positions near the left and right end surfaces of the main portion 72 of the heat sink 70.

Furthermore, an L-shaped notch 62*a* is formed at each of the upper and lower ends of the pair of left and right positioning portions 62. The board 24 is thereby brought into contact with the notches 62*a* in the four places to determine the position of the board 24 in the front-and-back direction of the unit when the board 24 and the heat sink 70 are fixed to the lens holder 50.

Figure 9:
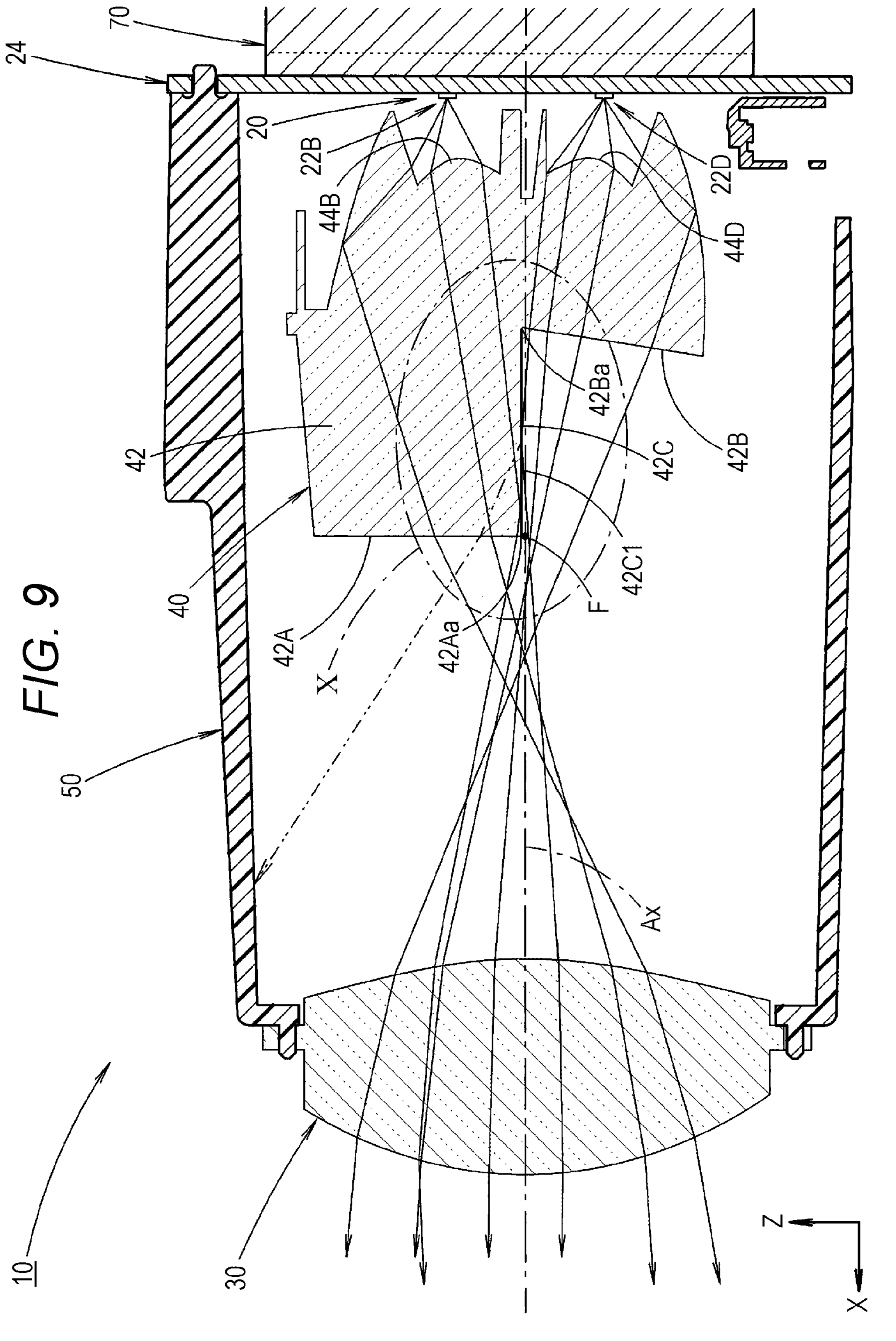
FIG. 9 is a detailed view of main elements of FIG. 3.
Figure 10:
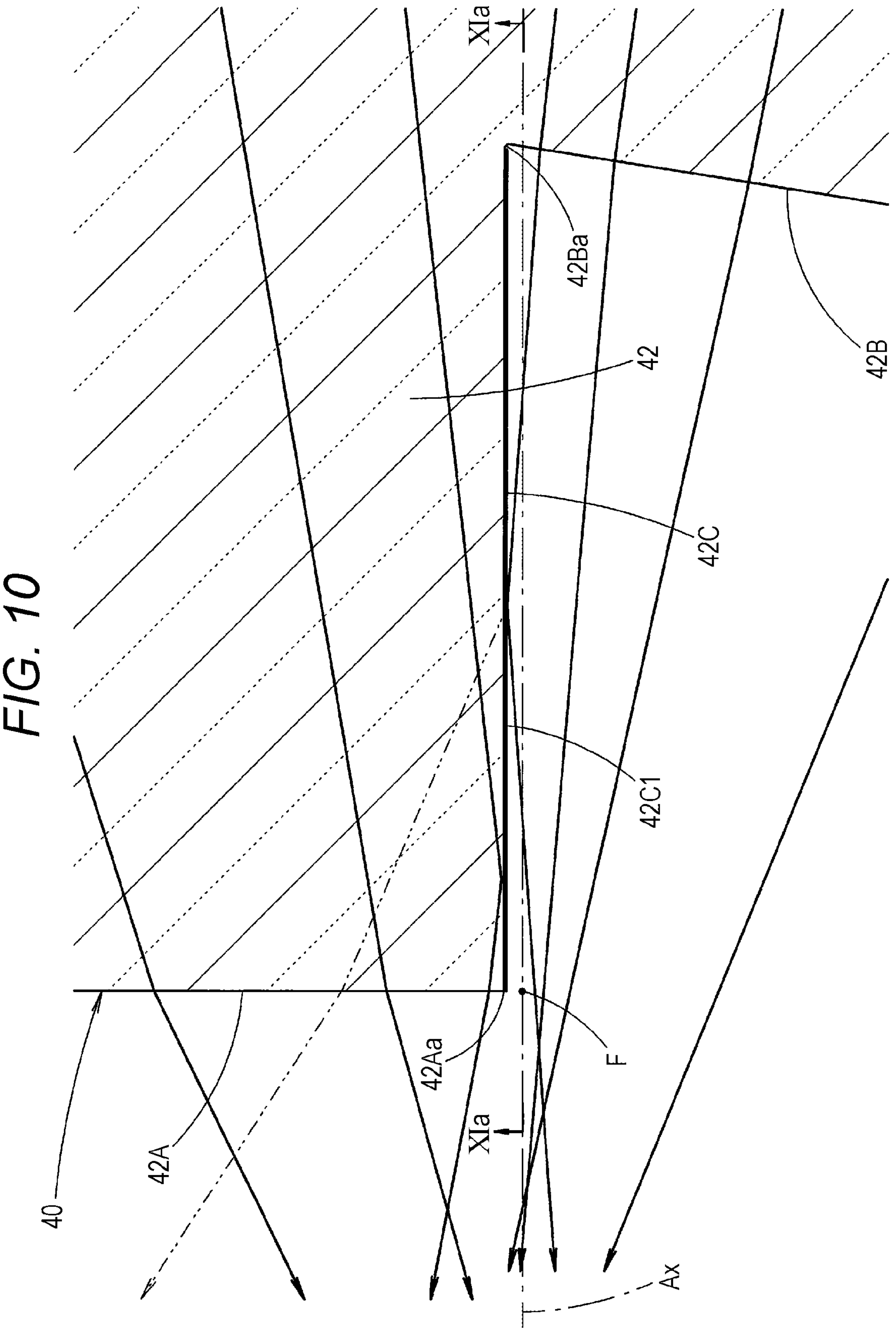
FIG. 10 is a detailed view of part X of FIG. 9.

FIG. 9 is a detailed view of main elements of FIG. 3. Moreover, FIG. 10 is a detailed view of part X of FIG. 9. Furthermore, FIG. 11(*a*) is a cross-sectional view taken along line XIa-XIa of FIG. 10.

Figure 11:
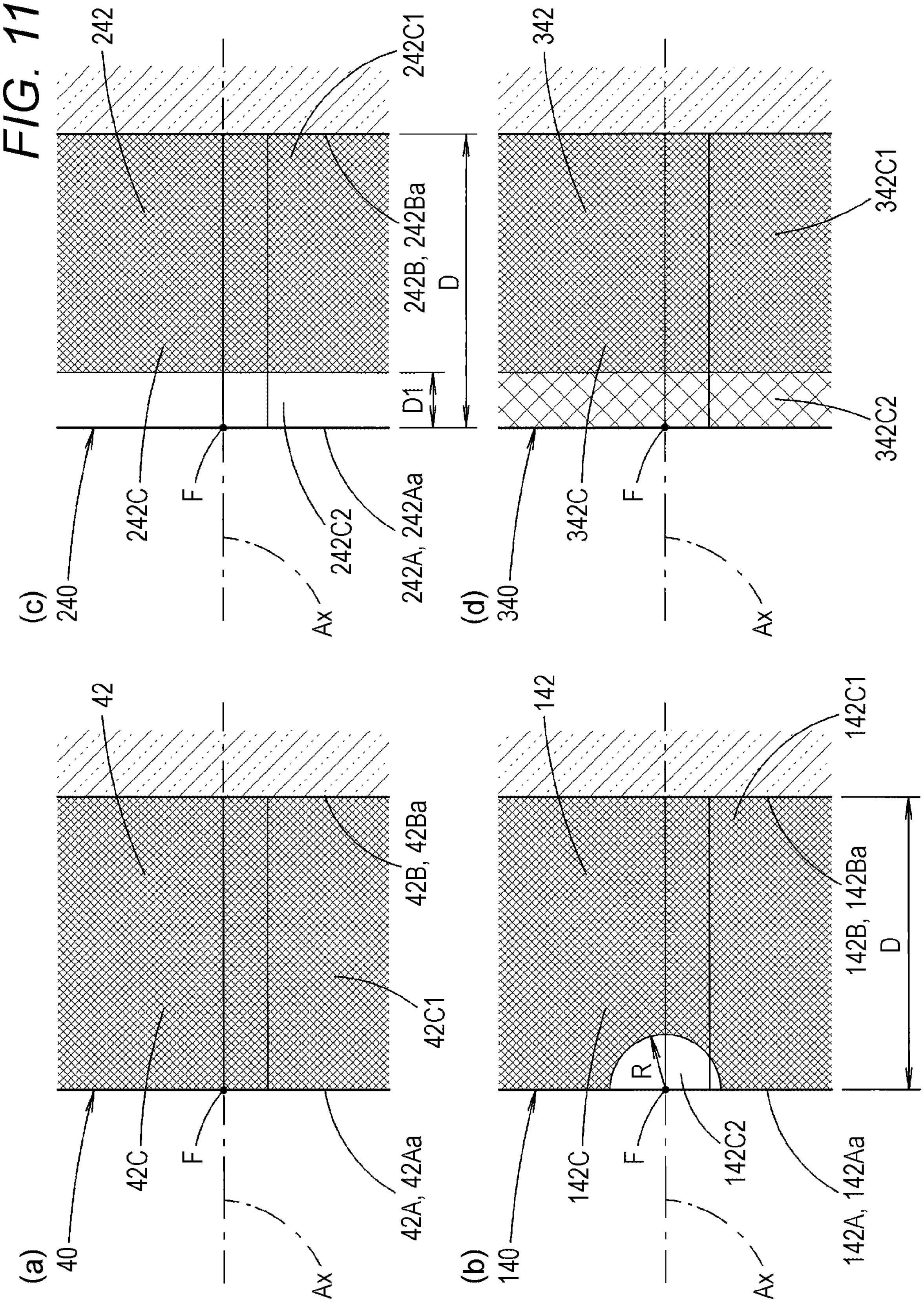
FIG. 11(*a*) is a cross-sectional view taken along line XIa-XIa of FIG. 10, and FIGS. 11(*b*), 11(*c*), and 11(*d*) are diagrams similar to FIG. 11(*a*), illustrating first, second, and third modifications of the embodiment.

As illustrated in FIG. 11(*a*), the mirror surface portion 42C1 is provided all over the connection surface 42C forming the underside of the block portion 42 of the light guide 40. The mirror surface portion 42C1 is formed by, for example, depositing aluminum on the connection surface 42 in a vacuum.

As illustrated in FIGS. 9 and 10, most of the light from the light-emitting element 22B that has entered the light guide 40 from the entrance portion 44B located directly above the optical axis Ax directly reaches the first exit surface 42A, and is emitted, as diagonally downward light, toward the projection lens 30 through the first exit surface 42A. However, a part of the light reaches the first exit surface 42A after being totally reflected by the connection surface 42C, and is emitted, as diagonally upward light, toward the projection lens 30 through the first exit surface 42A.

On the other hand, the light from the light-emitting element 22D that has entered the light guide 40 from the entrance portion 44D is emitted toward the projection lens 30 through the second exit surface 42B, and thereafter most of the light directly reaches the projection lens 30. However, a part of the light reaches the connection surface 42C. At this point in time, if the mirror surface portion 42C1 is not provided on the connection surface 42C, the light that has reached the connection surface 42C re-enters the block portion 42 through the connection surface 42C as indicated by a chain double-dashed line in the drawings, and is then emitted as diagonally upward light through the first exit surface 42A in a direction deviating from the projection lens 30. In practice, the mirror surface portion 42C1 is actually provided all over the connection surface 42C. Therefore, the light that has reached the connection surface 42C is reflected by the mirror surface portion 42C1 and reaches the projection lens 30 as diagonally downward light.

Figure 12:
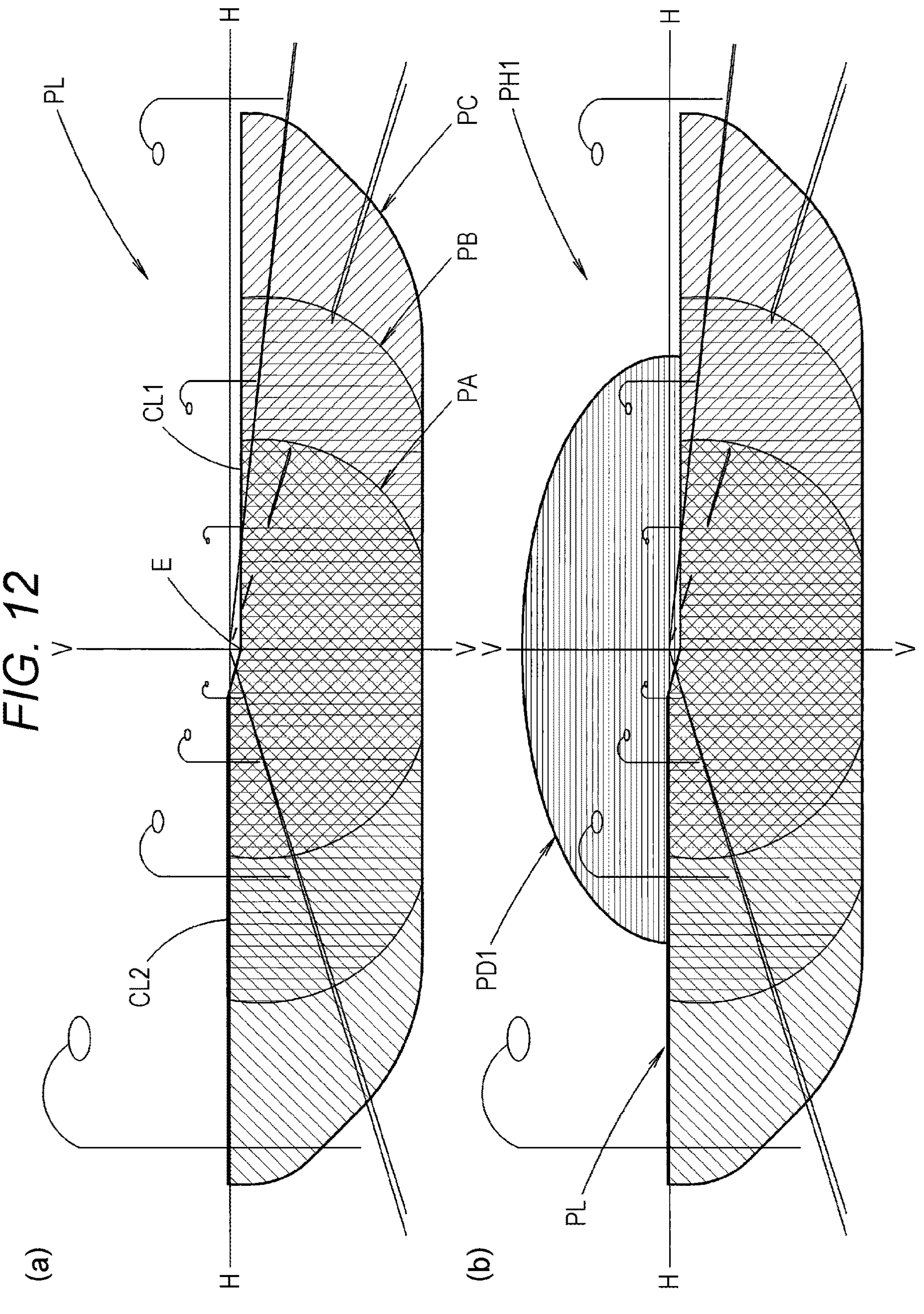
FIGS. 12(*a*) and 12(*b*) are diagrams illustrating light distribution patterns formed by illumination light from the light unit.

FIGS. 12(*a*) and 12(*b*) are diagrams illustrating, in a perspective manner, light distribution patterns that are formed on a virtual vertical screen placed 25 m ahead of the vehicle by use of the light projected to the front of the unit from the light unit 10 of the vehicle light 100. FIG. 12(*a*) is a diagram illustrating a low-beam light distribution pattern PL, and FIG. 12(*b*) is a diagram illustrating a high-beam light distribution pattern PH1.

As illustrated in FIG. 12(*a*), the low-beam light distribution pattern PL is a low-beam light distribution pattern of left light distribution, and includes, at the upper edge thereof, cut-off lines CL1 and CL2 on the right and left sides that are at different heights. The cut-off lines CL1 and CL2 extend in the horizontal direction at different heights on the right and left sides across line V-V passing in the vertical direction through H-V, which is the vanishing point in the front direction of the light. An opposite lane on the right side of line V-V is formed as the lower cut-off line CL1, and the own driving lane on the left side of line V-V is formed as the upper cut-off line CL2 stepped up from the lower cut-off line CL1 via an inclined portion. In the low-beam light distribution pattern PL, an elbow point E, which is an intersection point between the lower cut-off line CL1 and line V-V, is located approximately 0.5 to 0.6° below H-V.

The low-beam light distribution pattern PL is formed as a combined light distribution pattern of three light distribution patterns PA, PB, and PC.

Each of the light distribution patterns PA, PB, and PC is a light distribution pattern formed as an inverted projection image of a projection image that is formed on the first exit surface 42A of the light guide 40 with the light emitted from the respective light-emitting element 22A, 22B, or 22C. The low-beam light distribution pattern PL formed as the combined light distribution pattern of the light distribution patterns PA, PB, and PC is formed in an outer shape substantially matching the outer shape of the first exit surface 42A of the light guide 40.

Upon the formation, since the light guide 40 is placed in such a manner that the first exit surface 42A is located at the back focal plane of the projection lens 30, the cut-off lines CL1 and CL2 of the low-beam light distribution pattern PL are clearly formed.

As illustrated in FIG. 12(*b*), the high-beam light distribution pattern PH1 is obtained by adding an additional light distribution pattern PD1 spreading upward of the cut-off lines CL1 and CL2 with reference to the low-beam light distribution pattern PL.

The additional light distribution pattern PD1 is a light distribution pattern formed as an inverted projection image of a projection image that is formed in the back focal plane of the projection lens 30 with the light from the light-emitting element 22D emitted through the second exit surface 42B of the light guide 40. Upon the formation, since the position of the upper end of the projection image is determined by the lower edge 42Aa of the first exit surface 42A, the position of the lower end of the additional light distribution pattern PD1 is determined by the cut-off lines CL1 and CL2. Therefore, the high-beam light distribution pattern PH1 is a light distribution pattern in which the low-beam light distribution pattern PL and the additional light distribution pattern PD1 are connected with no gaps.

Next, the operations of the embodiment are described.

The light unit 10 according to the embodiment is configured in such a manner as to project the light from the light source 20 to the front of the unit through the projection lens 30. However, the light guide 40 configured to guide the light emitted from the light source 20 into the projection lens 30 is placed between the light source 20 and the projection lens 30. As a result, it is possible to form a light distribution pattern of a desired shape by the light guide 40 controlling the light that enters the projection lens 30.

Specifically, since the light source 20 includes the three light-emitting elements 22A, 22B, and 22C (a first light source) for forming the low-beam light distribution pattern PL, and the light-emitting element 22D (a second light source) for forming the high-beam light distribution pattern PH1 by being turned on simultaneously with the light-emitting elements 22A to 22C. Moreover, the light guide 40 includes the first exit surface 42A for emitting the light for the low-beam light distribution pattern PL, and the second exit surface 42B for emitting the light for the additional light distribution pattern PD1 that is added to the low-beam light distribution pattern PL to form the high-beam light distribution pattern PH1. As a result, it is possible to selectively form the low-beam light distribution pattern PL and the high-beam light distribution pattern PH1.

Upon the formation, below the first exit surface 42A in the light guide 40, the second exit surface 42B is displaced toward the back of the unit relative to the first exit surface 42A. Consequently, the cut-off lines CL1 and CL2 of the low-beam light distribution pattern PL can be formed based on the shape of the lower edge 42Aa of the first exit surface 42A.

In addition, the light guide 40 includes the connection surface 42C extending toward the back of the unit from the lower edge 42Aa of the first exit surface 42A to the upper edge 42Ba of the second exit surface 42B, and the connection surface 42C is provided with the mirror surface portion 42C1. Consequently, the following operations and effects can be obtained.

In other words, if the light from the light-emitting element 22D that has been emitted through the second exit surface 42B and reached the connection surface 42C results in re-entering the light guide 40 through the connection surface 42C, the luminous flux utilization factor of the light emitted from the light-emitting element 22D decreases. Consequently, the brightness of the additional light distribution pattern PD1 decreases. Therefore, the high-beam light distribution pattern PH1 cannot be formed with desired luminous intensity distribution.

However, in the embodiment, the mirror surface portion 42C1 is provided all over the connection surface 42C of the light guide 40. Therefore, it is possible to avoid the light from the light-emitting element 22D that has been emitted through the second exit surface 42B and reached the connection surface 42C from re-entering the light guide 40 through the connection surface 42C. The light from the light-emitting element 22D that has reached the connection surface 42C is reflected by the mirror surface portion 42C1, and therefore can be used as the light for forming the additional light distribution pattern PD1. As a result, the high-beam light distribution pattern PH1 can be formed with desired luminous intensity distribution.

In addition, the light guide 40 is formed of the single member; therefore, it is possible to obtain the above operations and effects, in addition to promoting cost reduction based on a reduction in the number of components of the light unit 10.

As described above, according to the embodiment, it is possible to appropriately form the low-beam light distribution pattern PL and the high-beam light distribution pattern PH1, in addition to promoting cost reduction based on a reduction in the number of components, in the light unit 10 including the projection lens 30.

Moreover, the light unit 10 according to the embodiment includes the three light-emitting elements 22A, 22B, and 22C as the first light source for forming the low-beam light distribution pattern PL, and includes, as the light guide 40, the three entrance portions 44A to 44C for letting in the light emitted from the three respective light-emitting elements 22A, 22B, and 22C. Therefore, it is possible to clearly form the low-beam light distribution pattern PL in a desired shape.

In the above embodiment, a description is given, assuming that the light guide 40 is formed of a colorless and transparent polycarbonate resin member. However, the light guide 40 can also be formed of, for example, a colorless and transparent acrylic resin member, or a colorless and transparent glass member.

In the above embodiment, the configuration of the light guide 40 is described, assuming that the mirror surface portion 42C1 is provided all over the connection surface 42C. However, the light guide 40 can also be configured to partially include a region where the mirror surface portion 42C1 is not provided.

In the above embodiment, a description is given, assuming that all of the four light-emitting elements 22A to 22D have the horizontal rectangular light emitting surface. However, the four light-emitting elements 22A to 22D can also be configured in another outer shape (for example, a square shape or a vertical rectangular shape).

In the above embodiment, a description is given, assuming that the first light source includes the three light-emitting elements 22A, 22B, and 22C, and the second light source includes the one light-emitting element 22D. However, it is also possible to set the numbers of the first and second light sources at numbers different from those of the above embodiment.

Next, modifications of the above embodiment are described.

Firstly, a first modification of the above embodiment is described.

FIG. 11(*b*) is a diagram similar to FIG. 11(*a*), illustrating main elements of a light unit according to the modification.

As illustrated in FIG. 11(*b*), the basic configuration of the modification is similar to that of the above embodiment. However, a part of the configuration of a light guide 140 is different from the light guide of the above-embodiment.

In other words, the light guide 140 of the modification is also configured in such a manner as to be provided with a mirror surface portion 142C1 on a connection surface 142C forming the underside of a block portion 142 of the light guide 140, but is different from the light guide of the above embodiment in that a part of the region of the connection surface 142C is formed as a light transmission portion 142C2.

Specifically, a region on the connection surface 142C, which is located near the back focal point F of the projection lens 30 (refer to FIG. 1), is formed as the light transmission portion 142C2 having a transparent surface without the mirror surface portion 142C1 (in other words, the region has not undergone, for example, aluminum vacuum deposition).

The light transmission portion 142C2 is set as a semicircular region with a radius R centered on the back focal point F of the projection lens 30 in plan view. Upon the setting, the value of the radius R is set at a value equal to or less than ⅓ (for example, approximately ¹⁄₁₀ to ¼) of a front-to-back width (that is, the width from a lower edge 142Aa of a first exit surface 142A to an upper edge 142Ba of a second exit surface 142B) D of the connection surface 142C. It is preferable to set a value of R=approximately 4 to 10 mm as a specific value of the radius R.

With the adoption of the configuration of the modification, the following operations and effects can be obtained.

In other words, a focal point neighboring portion on the block portion 142 of the light guide 140, the focal point neighboring portion being located near the back focal point F of the projection lens 30, may become hot due to concentration of, for example, sunlight that enters from the outside of the light unit through the projection lens 30.

The light guide 140 of the modification is formed of a resin member and therefore is likely to be eroded due to the effect of concentration of, for example, sunlight. At this point in time, if the mirror surface portion 142C is provided all over the connection surface 142C of the light guide 140, heat is likely to be trapped in the focal point neighboring portion of the light guide 140; therefore, erosion is more likely to occur.

However, in the light guide 140 of the modification, the region on the connection surface 142C, the region being located near the back focal point F of the projection lens 30, is formed as the light transmission portion 142C2. Therefore, it is possible to emit a part of, for example, sunlight that enters the focal point neighboring portion on the block portion 142 of the light guide 140 to the lower space without the connection surface 142C reflecting the part of sunlight. As a result, it is possible to reduce heat to be trapped in the focal point neighboring portion. Therefore, occurrence of erosion can be effectively restrained.

In the above first modification, a description is given, assuming that the light transmission portion 142C2 is set as a semicircular region, but can also be configured in such a manner as to be set as a region having another shape.

Next, a second modification of the above embodiment is described.

Figure 13:
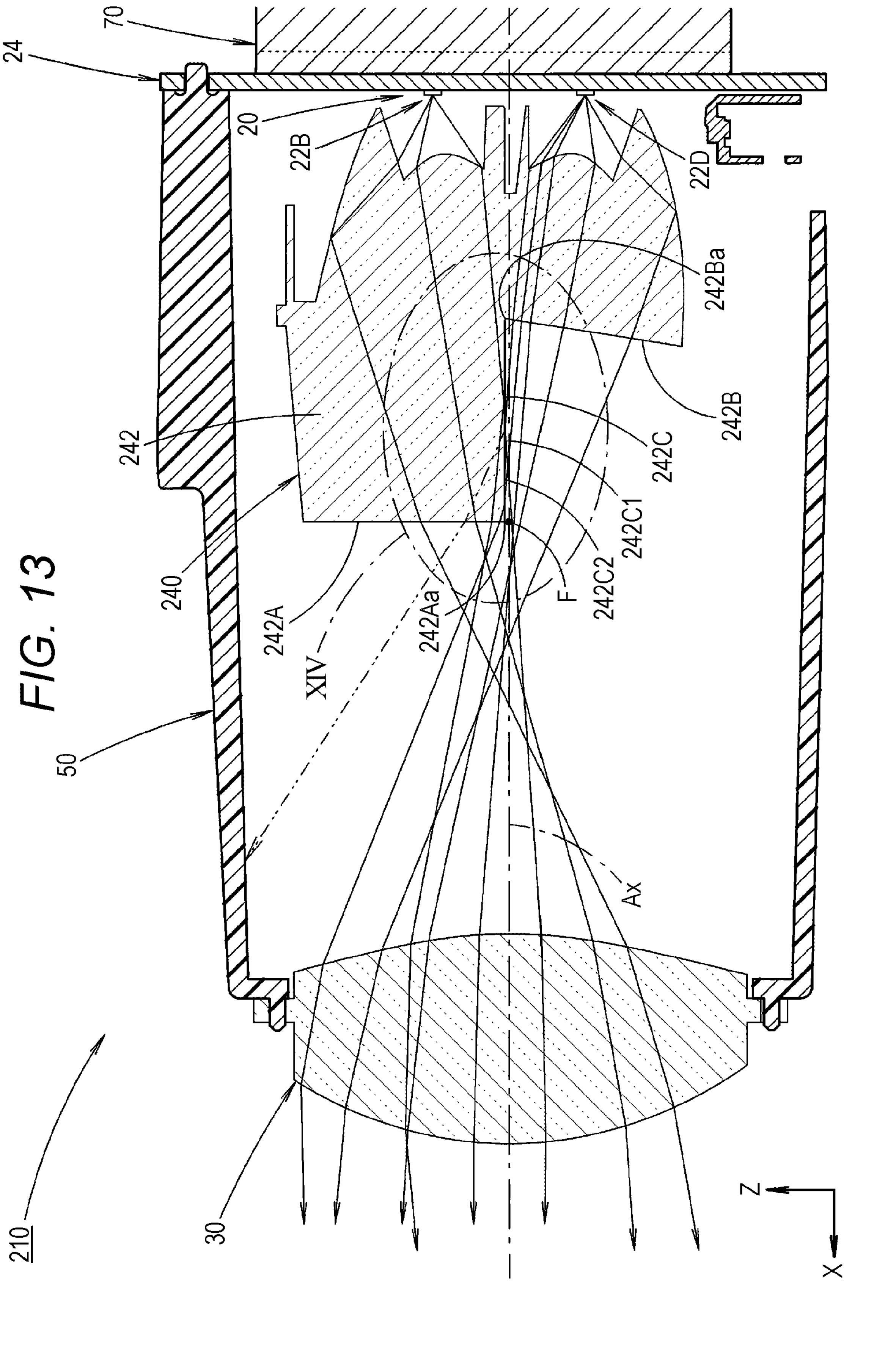
FIG. 13 is a diagram similar to FIG. 9, illustrating the second modification.
Figure 14:
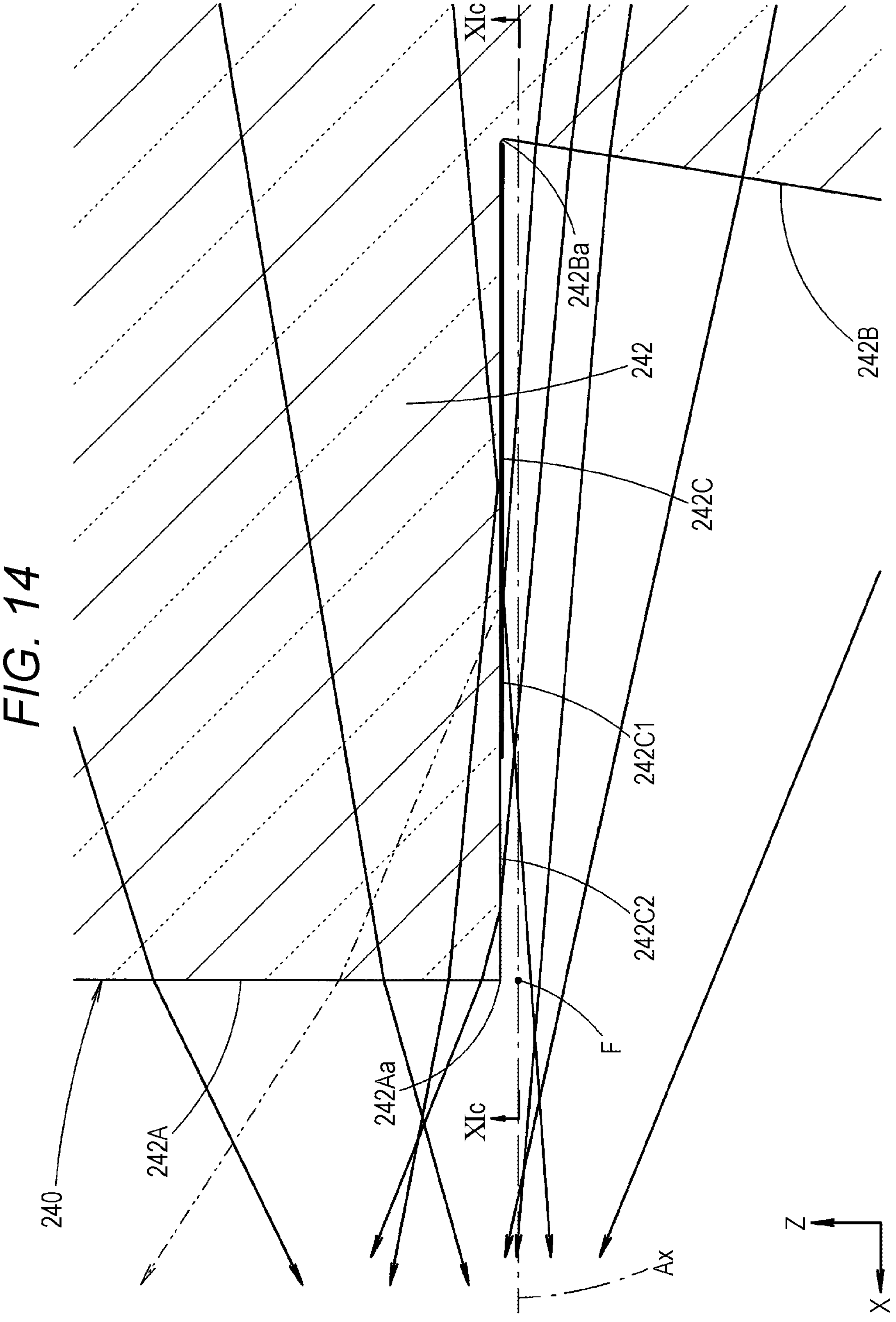
FIG. 14 is a detailed view of part XIV of FIG. 13.

FIG. 13 is a diagram similar to FIG. 9, illustrating a light unit 210 according to the modification. FIG. 14 is a detailed view of part XIV of FIG. 13. Moreover, FIG. 11(*c*) is a cross-sectional view taken along line XIc-XIc of FIG. 14 (that is, a diagram similar to FIG. 11(*a*)).

As illustrated in FIGS. 13 and 14, the basic configuration of the modification is similar to that of the above embodiment. However, a part of the configuration of a light guide 240 is different from the light guide of the above embodiment.

In other words, the light guide 240 of the modification is also configured in such a manner as to be provided with a mirror surface portion 242C1 having a transparent surface on a connection surface 242C forming the underside of a block portion 242 of the light guide 240, but is different from the light guide of the above embodiment in that a neighboring region of the front edge of the connection surface 242C is formed as a light transmission portion 242C2.

Specifically, as illustrated in FIG. 11(*c*), a band-shaped region on the connection surface 242C, which has a fixed front-to-back width from a lower edge 242Aa of a first exit surface 242A, is formed as the light transmission portion 242C2 having a transparent surface without the mirror surface portion 242C1 (that is, the band-shaped region has not undergone, for example, aluminum vacuum deposition).

The value of a front-to-back width D1 of the light transmission portion 242C2 is set at a value equal to or less than ⅓ (for example, approximately 1/10 to ¼) of a front-to-back width (that is, the width from the lower edge 242Aa of the first exit surface 242A to an upper edge 242Ba of a second exit surface 242B) D of the connection surface 242C. Upon the setting, it is preferable to set a value of D1=approximately 4 to 10 mm as a specific value of the front-to-back width D1.

Figure 15:
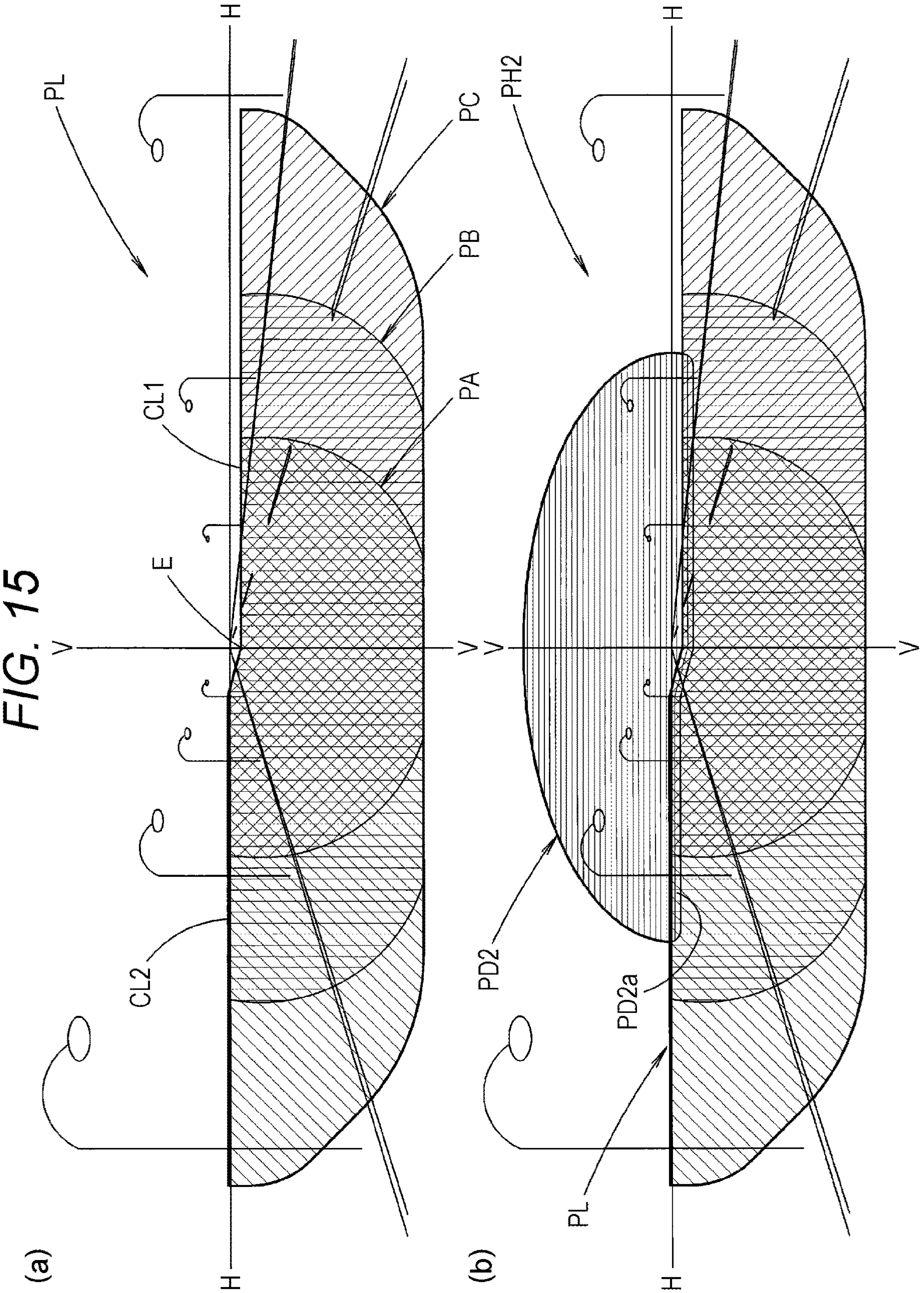
FIGS. 15(*a*) and 15(*b*) are diagrams similar to FIGS. 12(*a*) and 12(*b*), illustrating the operations of the second modification.

FIGS. 15(*a*) and 15(*b*) are diagrams similar to FIGS. 12(*a*) and 12(*b*), illustrating light distribution patterns formed by illumination light from the light unit 210 according to the modification.

The low-beam light distribution pattern PL illustrated in FIG. 15(*a*) is similar to the low-beam light distribution pattern of the above embodiment. However, a high-beam light distribution pattern PH2 illustrated in FIG. 15(*b*) is different from the high-beam light distribution pattern of the above embodiment.

In other words, the high-beam light distribution pattern PH2 is obtained by adding an additional light distribution pattern PD2 to the low-beam light distribution pattern PL. However, the additional light distribution pattern PD2 is formed with a lower edge portion PD2*a* thereof partially overlapping neighboring regions of the cut-off lines CL1 and CL2 of the low-beam light distribution pattern PL.

This is because light from the second exit surface 242B that has been emitted through the second exit surface 242B of the light guide 240 and reached the neighboring region of the front edge of the connection surface 242C re-enters the light guide 240 through the light transmission portion 242C2 in the neighboring region of the front edge, and is emitted to the front of the unit through a neighboring region of the lower edge of the first exit surface 242A, and therefore a projection image formed in the back focal plane of the projection lens 30 slightly expands upward.

With the adoption of the configuration of the modification, the following operations and effects can be obtained.

In the light unit 210 according to the modification, the additional light distribution pattern PD2 can be formed with the lower edge portion PD2*a* partially overlapping the neighboring regions of the cut-off lines CL1 and CL2 of the low-beam light distribution pattern PL. Therefore, the high-beam light distribution pattern PH2 can be formed as a substantially uniform light distribution pattern in which the low-beam light distribution pattern PL and the additional light distribution pattern PD2 are smoothly connected.

Upon the formation, in terms of the light guide 240 of the modification, a front-to-back width D2 of the light transmission portion 242C2 is set at the value equal to or less than ⅓ of the front-to-back width D of the connection surface 242C; therefore, the high-beam light distribution pattern PH2 can be formed with more preferable luminous intensity distribution.

Moreover, also in the modification, the region on the connection surface 242C of the light guide 240, the region being located near the back focal point F of the projection lens 30, is formed as the light transmission portion 242C2. Therefore, it is possible to cause a part of, for example, sunlight that enters the focal point neighboring portion on the block portion 242 of the light guide 240 to be emitted to the lower space without being reflected by the connection surface 242C. As a result, it is possible to reduce heat to be trapped in the focal point neighboring portion. Therefore, occurrence of erosion can be effectively restrained.

In the second modification, a description is given, assuming that the light transmission portion 242C2 of the connection surface 242C is formed as the band-shaped region having the fixed front-to-back width D1 from the lower edge 242Aa of the first exit surface 242A. However, in addition to this, it is possible to adopt the light transmission portion 242C2 formed as, for example a band-shaped region having a front-to-back width that changes depending on the position of the light transmission portion 242C2 in the left-and-right direction, or as a band-shaped region having a fixed front-to-back width with the front edge at a position slightly away from the lower edge 242Aa of the first exit surface 242A toward the back of the unit.

Next, a third modification of the above embodiment is described.

FIG. 11(*d*) is a diagram similar to FIG. 11(*a*), illustrating main elements of a light unit according to the modification.

As illustrated in FIG. 11(*d*), the basic configuration of the modification is similar to that of the second modification, but a part of the configuration of a light transmission portion 342C2 is different from the light transmission portion of the second modification.

In other words, a light guide 340 of the modification is also configured in such a manner that a neighboring region of the front edge of a connection surface 342C forming the underside of a block portion 342 of the light guide 340 is formed as the light transmission portion 342C2, but is different from the light guide of the second modification in that the light transmission portion 342C2 is formed as not a transparent surface but a semitransparent surface.

The light transmission portion 342C2 of the modification is set as a band-shaped region having the same shape as the light transmission portion 242C2 of the second modification, but is configured in such a manner that the band-shaped region has undergone half vapor deposition of aluminum. Consequently, the light transmission portion 342C2 is configured in such a manner as not to transmit all the light reaching the connection surface 342C but to reflect some proportion of the light.

Specifically, the reflectivity of a mirror surface portion 342C1 is set at a value equal to or greater than 90% whereas the reflectivity of the light transmission portion 342C2 is set at a value equal to or less than 50% (for example, a value of approximately 30 to 40%).

With the adoption of the configuration of the modification, the following operations and effects can be obtained.

In other words, in the additional light distribution pattern formed with the illumination light from the light unit according to the modification, the brightness of the neighboring region below the cut-off lines CL1 and CL2 at the lower edge portion PD2*a* is slightly decreased as compared to the additional light distribution pattern PD2 illustrated in FIG. 15(*b*), but the brightness of a neighboring region above the cut-off lines CL1 and CL2 is increased by the decrease. Therefore, the high-beam light distribution pattern can be formed in such a manner as to have more excellent long-distance visibility than the high-beam light distribution pattern PH2 in addition to maintaining the substantially uniform light distribution pattern in which the low-beam light distribution pattern PL and the additional light distribution pattern are smoothly connected.

Note that the numerical values indicated as the specifications in the above embodiment and the modifications thereof are merely examples, and naturally these values may be set at different values as appropriate.

Moreover, the invention of the present application is not limited to the configurations described in the above embodiment and the modifications thereof, and can adopt configurations to which various other modifications are added.

The international application claims priority based on Japanese Patent Application No. 2020-207632 filed on Dec. 15, 2020, the entire contents of which are incorporated herein by reference.

The above description of the specific embodiment of the present invention has been presented for the purpose of illustration. They are not intended to be exhaustive or to limit the present invention to the form as described. It is obvious to those skilled in the art that many modifications and alterations can be made in light of the above description.

LIST OF REFERENCE SIGNS

10, 210 Light unit
20 Light source
22A, 22B, 22C Light-emitting element (first light source)
22D Light-emitting element (second light source)
24 Board
24*a*, 72*a* Screw insertion hole
24*b*, 32*a*, 46*a* Positioning hole
26 Connector
30 Projection lens
32 Outer peripheral flange portion
32*b* Positioning groove
40, 140, 240, 340 Light guide
42, 142, 242, 342 Block portion
42A, 142A, 242A First exit surface
42Aa, 142Aa, 242Aa Lower edge
42B, 142B Second exit surface
42Ba, 142Ba Upper edge
42C, 142C, 242C, 342C Connection surface
42C1, 142C1, 242C1, 342C1 Mirror surface portion
44A, 44B, 44C, 44D Entrance portion
46 Outer peripheral flange portion
50 Lens holder
52 Lens support portion
52*a*, 52*b*, 54*a* Positioning pin
54 Light guide support portion
56 Screw boss
58 Stepped positioning pin
58*a* Distal end small-diameter portion
58*b* Distal end flat portion
60 Reinforcing rib
62 Positioning portion
62*a* Notch
70 Heat sink
72 Main portion
74 Radiating fin
76 Screw
100 Vehicle light
102 Lamp body
104 Translucent cover
142C2, 242C2, 342C2 Light transmission portion
Ax Optical axis
CL1 Lower cut-off line
CL2 Upper cut-off line
D Front-to-back width of the connection surface
D1 Front-to-back width of the light transmission portion
E Elbow point
F Back focal point
PA, PB, PC Light distribution pattern
PD1, PD2 Additional light distribution pattern
PD2*a* Lower edge portion
PH1, PH2 High-beam light distribution pattern
PL Low-beam light distribution pattern
R Radius of the light transmission portion

What is claimed is:

1. A light unit configured to project light from a light source to a front of the unit through a projection lens, the light unit comprising:

a light guide configured to guide the light emitted from the light source into the projection lens is placed between the light source and the projection lens, wherein the light source includes a first light source for forming a low-beam light distribution pattern, and a second light source for forming a high-beam light distribution pattern by being turned on simultaneously with the first light source, the light guide includes a first exit surface for emitting light for the low-beam light distribution pattern, and a second exit surface for emitting light for an additional light distribution pattern that is added to the low-beam light distribution pattern to form the high-beam light distribution pattern, the second exit surface is formed below the first exit surface and at a position displaced toward the back of the unit relative to the first exit surface, the light guide includes a connection surface extending toward the back of the unit from a lower edge of the first exit surface to an upper edge of the second exit surface, the connection surface is provided with a mirror surface portion, the connection surface is configured to include a neighboring region of a front edge of the connection surface as a light transmission portion, and a front-to-back width of the neighboring region of the front edge is set at a value equal to or less than ⅓ of a front-to-back width of the connection surface.

2. The light unit according to claim 1, wherein the connection surface is configured to include a region located near a back focal point of the projection lens as the light transmission portion.

3. The light unit according to claim 2, wherein the light transmission portion is a semicircular region with a radius R centered on the back focal point of the projection lens in plan view, and a value of the radius R is set at the value equal to or less than ⅓ of the front-to-back width of the connection surface.

4. The light unit according to claim 1, wherein the light guide is formed of a resin member.

5. The light unit according to claim 1, comprising a plurality of the first light sources, wherein the light guide includes a plurality of entrance portions for letting in light emitted from the plurality of the respective first light sources.

* * * * *